United States Patent [19]

Hashimoto

[11] Patent Number: 5,124,215
[45] Date of Patent: Jun. 23, 1992

[54] MAGNETIC MATERIAL FOR MAGNETIC REFRIGERATION

[75] Inventor: Takasu Hashimoto, Kawasaki, Japan

[73] Assignee: Tokyo Institute of Technology, Tokyo, Japan

[21] Appl. No.: 323,815

[22] Filed: Mar. 15, 1989

Related U.S. Application Data

[60] Division of Ser. No. 91,097, Aug. 26, 1987, Pat. No. 4,829,770, which is a continuation-in-part of Ser. No. 686,883, Dec. 27, 1984, abandoned.

[30] Foreign Application Priority Data

Mar. 30, 1984 [JP] Japan .................................. 59-60872

[51] Int. Cl.⁵ ............................................. H01F 1/00
[52] U.S. Cl. ................................... 428/611; 428/615; 428/635; 428/650; 428/654; 428/548; 428/928
[58] Field of Search .............. 428/611, 615, 635, 654, 428/928, 548, 650; 62/3.1

[56] References Cited

U.S. PATENT DOCUMENTS

| | | | |
|---|---|---|---|
| 3,421,330 | 1/1969 | Otter, Jr. et al. | 62/3 |
| 3,436,924 | 4/1969 | Lawless | 62/3 |
| 3,447,912 | 6/1969 | Ortner et al. | 420/416 |
| 3,841,107 | 10/1974 | Clark | 62/3 |
| 4,107,935 | 8/1978 | Steyert, Jr. | 62/3 |
| 4,408,463 | 10/1983 | Barclay | 62/3 |
| 4,457,135 | 7/1984 | Hakuraku et al. | 62/3 |
| 4,464,903 | 8/1984 | Nakagome et al. | 62/3 |
| 4,642,994 | 2/1987 | Barclay et al. | 62/3 |
| 4,704,871 | 11/1987 | Barclay et al. | 62/3 |

FOREIGN PATENT DOCUMENTS

| | | | |
|---|---|---|---|
| 1533394 | 4/1972 | Fed. Rep. of Germany | 420/416 |
| 57-84106 | 5/1982 | Japan | 148/301 |

OTHER PUBLICATIONS

Zimm, C. B. et al., "Low Hysteresis Materials for Magnetic Refrigeration: $Gd_{1-x}ER_xAl_2$", 931 Journal of Applied Physics, 55(6), Mar. 15, 1984, pp. 2609–2610.

Kazuhara, T. et al., Magnetic Entropy of the Mixed and Sintered Compound of the $RAl_2$ System, (5 pp., unpublished as of Aug. 1986).

Hashimoto, T., Recent Investigations on Refrigerants for Magnetic Refrigerators, (10 pp., unpublished as of Aug. 1986).

Hashimoto, T. et al., Investigations on the Possibility of The $RAl_2$ System as a Refrigerant in an Ericsson Type Magnetic Refrigerator (i pp., unpublished as of Aug. 1986).

Lemaire et al., C.R. Acad. Sc., pp. 244–247, Jul. 7, 1968.

Kazuhara, T. et al., Magnetic Entropy of the Mixed and Sintered Compound of the $RAl_2$ System, pp. 280–285, delivered ICEC-11 at Berlin, Apr. 22, 1986.

Hashimoto, T. et al., Recent Progress in Magnetic Refrigeration Studies by the Tokyo Institute of Technology and Toshiba Group, Int'l Cryogenic Materials Conference, Jun. 14–18, 1987, pp. 1–10.

Primary Examiner—John P. Sheehan
Attorney, Agent, or Firm—Spencer, Frank & Schneider

[57] ABSTRACT

A magnetic refrigeration composition for magnetic refrigeration including at least three kinds of magnetic substances selected from the group consisting of magnetic substances having the formula $R'Al_2$, $R'_3Al_2$, and $R'Al_{2+\delta}$ wherein $R'$ is at least one element selected from the group consisting of Gd, Tb, Dy, Ho and Er, provided that the total number of atoms satisfies the above formula and $0 < \delta < 0.2$, the composition being a mixture of the magnetic substances or a multilayered composition of the magnetic substances, and when a multilayered composition, each layer of the multilayered composition consists of one magnetic substance, wherein each kind of said at least three kinds of magnetic substances has a Curie temperature which is different from that of the other kinds and which preferably range up to about 77° K.

18 Claims, 12 Drawing Sheets

FIG_13

MAGNETIC MATERIAL FOR MAGNETIC REFRIGERATION

This is a division of application Ser. No. 07/091,097 filed Aug. 26th, 1987, now U.S. Pat. No. 4,829,770 which a continuation-in-part application Ser. No. 06/686,883 filed Dec. 27th, 1984.

BACKGROUND OF THE INVENTION

1. Field of the Invention

The present invention relates to magnetic materials for magnetic refrigeration, particularly to magnetic refrigeration compositions for magnetic refrigeration suited for use in magnetic refrigerators having a refrigeration initiating temperature of 77° K.

2. Description of the Prior Art

Magnetic refrigeration is a type of refrigeration which is accomplished by the cyclic operations of heat dissipation and heat absorption in the course of magnetization or demagnetization by adding or eliminating outer magnetic fields applied to magnetic substances. It is theoretically the same type of process as that of conventional refrigeration which is accomplished by the cyclic operations of compression and expansion in gas systems In low temperature regions, such as below 15° K., the lattice specific heat of magnetic materials for magnetic refrigeration becomes small compared to the magnetic specific heat and a large magnetic entropy change may occur. The lattice specific heat values are negligible so that magnetic refrigeration can be accomplished in low temperature regions by using a magnetic refrigeration cycle of the reverse Carnot type as shown in FIG. 1.

This figure shows the reverse Carnot cycle of $A_c \rightarrow B_c \rightarrow C_c \rightarrow D_c$ on curves of temperature (T) versus total entropy (S/R) of a magnetic substance where S is total entropy and R is the universal gas constant. Total entropy S of a magnetic substance is defined by the equation $S = S_L + S_J(T,O) + \Delta S_J(T,B)$, where $S_L$ is lattice entropy, $S_J(T,O)$ is magnetic entropy in zero magnetic field, and $\Delta S_J(T,B)$ is magnetic entropy change induced by an external magnetic field. In the present invention, only S and $\Delta S_J$ are used, and total entropy is defined as S/R, while magnetic entropy change is defined as $\Delta S/R$. These definitions agree with scientific literature where, in order to facilitate comparison with gas refrigeration, total entropy S and magnetic entropy change $\Delta S$ are reported under the convention in which they are divided by the universal gas constant R.

In the $A_c \rightarrow B_c$ change, a magnetic field is applied to a paramagnetic substance and increases from $B=0$ to $B_l$ at a temperature of $T_1$ and thereby causes the paramagnetic substance to undergo isothermal magnetization. Magnetic entropy, that is, entropy of a magnetic moment system, then decreases only by $-\Delta S_1/R$, so that the magnetic thermal capacity of $Q_1 = -\Delta S_1 T_1$ is released to the outside. In the $B_c \rightarrow C_c$ change, the outer magnetic field is decreased adiabatically from $B_1$ to $B_2$. In this change, the distribution of the magnetic moment occupying each level is substantially unchanged, that is, it is an isoentropic change and the temperature of the magnetic substance is caused to be lowered (adiabatic demagnetization). Thereafter, the reverse Carnot cycle is completed by isothermal demagnetization in the $C_c \rightarrow D_c$ change and adiabatic magnetization in the $D_c \rightarrow A_c$ change, which changes are reverse courses of $A_c \rightarrow B_c$ and $B_c \rightarrow C_c$. In the $C_c \rightarrow D_c$ change, the magnetic substance contrarily absorbs the magnetic thermal capacity of $Q_2 = \Delta S_2 T_2$ and the substance is cooled.

The principle of operation of magnetic refrigeration materials using the above described cycle is explained on the basis of a simplified block figure as shown in FIG. 2. The method of operation of magnetic refrigerators actually manufactured for trial is also introduced in brief as follows:

(i) During isothermal magnetization, heat switch I is closed and heat switch II is opened so that the magnetic field increases up to $B_1$. The thermal capacity or heating value $Q_1$ of the magnetic substance released during isothermal magnetization of the magnetic substance is released through the closed heat switch I into a heat source having a high temperature, and the magnetic substance is kept at a temperature of $T_1$.

(ii) During adiabatic demagnetization, heat switches I and II are opened and the magnetic field decreases from $B_1$ to $B_2$. The heat exchange between the magnetic substance and the heat source becomes an isoentropic change because these switches are opened, and the temperature of the magnetic substance is lowered to $T_2$.

(iii) During isothermal demagnetization, heat switch I is opened and heat switch II is closed so that the magnetic field decreases to zero. Accompanying the decrease of the magnetic field, the magnetic substance absorbs the thermal capacity $Q_2$ from a heat source having a low temperature (a cooled substance) through heat switch II and increases its self entropy so that cooling is realized.

(iv) During adiabatic magnetization, heat switches I and II are opened and the magnetic field is increased. This is a reverse course of (ii) and the temperature of the magnetic substance rises to $T_1$ so that it returns to the starting state.

Subsequently, when the cycle is repeated, refrigeration is possible.

Gadolinium gallium-garnet (abbreviated as "GGG" hereinafter) is a paramagnetic material which may be used as a magnetic substance for magnetic refrigerators having refrigeration in low temperature regions, especially in the region below 20° K., using the above reverse Carnot type magnetic refrigeration cycle. In a magnetic substance having a high Debye temperature, such as GGG, the lattice specific heat is almost negligible in the region below 20° K. compared to the magnetic specific heat and a large magnetic entropy change may occur even at a magnetic field of 6 teslas.

However, when a refrigeration initiating temperature is desired at the liquid nitrogen temperature of 77° K., the lattice specific heat of the magnetic substance becomes larger than the magnetic specific heat so that a reverse Carnot type cycle is not usable and an Ericsson cycle must be used. Furthermore, the heat disturbance energy of the magnetic moment also becomes greater so that paramagnetic materials such as GGG described above, are not usable.

A reverse Ericsson magnetic refrigeration cycle takes place in the high temperature region above 15° K. or 20° K., namely, in the region of not zero lattice entropy of the magnetic substance and is shown in FIG. 3. This figure shows the reverse Ericsson cycle $A_E \rightarrow B_E \rightarrow C_E \rightarrow D_E$ curves of total entropy (S/R) versus temperatures (T) of the magnetic substance. The difference between this cycle and the reverse Carnot cycle is that the demagnetization or magnetization at isoentropy in the Carnot cycle may be substituted by an isomagnetic field course accompanying entropy changes. In order to obtain a high efficiency approximating that of the Carnot efficiency in a magnetic refrigerator using the reverse Ericsson cycle, magnetic materials are necessary for which the relation of $\Delta S_1/R$ and $\Delta S_2/R$ as shown in FIG. 3 is $\Delta S_1/R = \Delta S_2/R$. That is, the magnetic entropy change ($\Delta S/R$) removable in the constant magnetic field should be constant in the $T_1$ to $T_2$ region, wherein $T_1$ and $T_2$ range, for example, from about 20° K. to about 77° K. However, magnetic materials which satisfy the above requirement in such a high temperature region have not been discovered as yet.

SUMMARY OF THE INVENTION

It is an object of the present invention to provide magnetic refrigeration compositions for magnetic refrigeration suitable for use in a high temperature region ranging from above about 20° K. to at least about 77° K., especially for magnetic refrigeration in magnetic refrigerators having about a 77° K. refrigeration initiation temperature.

This and other objects of the invention are accomplished by providing a first embodiment of a magnetic refrigeration composition for magnetic refrigeration comprising at least three kinds of magnetic substances selected from the group consisting of magnetic substances having the formulae $R'Al_2$, $R'_3Al_2$ and $ErAl_{2-\delta}$, wherein R' is at least one element selected from the group consisting of Gd, Tb, Dy, Ho and Er, provided that the total number of atoms satisfies the above formulae and $0<\delta<0.2$, said composition being a mixture of said magnetic substances present in mole ratios of X, Y, Z, . . . , N for each kind, respectively, where N is the mole ratio of the Nth kind of said at least three kinds of magnetic substances, and where the mole ratios range from 1 to less than 3, and each kind of said at least three kinds of magnetic substances having a Curie temperature $T_C$ which is different from that of the other kinds and is given by $T_{CX}$, $T_{CY}$, $T_{CZ}$, . . . , $T_{CN}$ respectively, where $T_{CN}$ is the Curie temperature of the Nth kind of said at least three kinds of magnetic substances.

This and other objects of the invention are accomplished by providing a second embodiment of a magnetic refrigeration composition for magnetic refrigeration comprising at least three kinds of magnetic substances selected from the group consisting of magnetic substances having the formulae $R'Al_2$, $R'_3Al_2$ and $ErAl_{2-\delta}$, wherein R' is at least one element selected from the group consisting of Gd, Tb, Dy, Ho and Er, provided that the total number of atoms satisfies the above formulae and $0<\delta<0.2$, said composition being a multilayered composition of said magnetic substances present in mole ratios for each kind of X, Y, Z, . . . , N, respectively, where N is the mole ratio of the Nth kind of said at least three kinds of magnetic substances, and where the mole ratios range from 1 to less than 3, each layer of said multilayered composition consisting of one kind of said at least three kinds of magnetic substances and each layer consisting of a different kind of said at least three kinds of magnetic substance, and each kind of said at least three kinds of magnetic substances having a Curie temperature which is different from that of the other kinds and is given by $T_{CX}$, $T_{CY}$, $T_{CZ}$, . . . , $T_{CN}$, respectively, where $T_{CN}$ is the Curie temperature $T_C$ of the Nth kind of said at least three kinds of magnetic substances, and the layers being arranged in the order of low to high Curie temperature.

A ferromagnetic substance is a substance which generates magnetic moments by itself, that is spontaneously, when the temperature is lowered without outer magnetic fields. However, these magnetic moments take random directions at high temperatures, and the material undergoes a phase transition and becomes paramagnetic. The temperature at which such a change occurs is called the Curie temperature $T_C$. As described above, the problem of a large magnetic field being required, because of the magnetic moment system having a large heat disturbance energy in the high temperature region, can be resolved by using an abnormal magnetic thermal capacity effect near the above described ferromagnetic-paramagnetic phase transition point in magnetic materials which exists in the 20° K. to the 77° K. region. The problem is how to use such a ferromagnetic substance to pull out a characteristic suited for the Ericsson cycle. For example, as shown in the $\Delta S/R$ versus T curve for $ErAl_2$ of FIG. 4, $\Delta S/R$ becomes maximum at $T_C$, however, $\Delta S/R$ does not remain constant or nearly constant over a high temperature region ranging up to 77° K.

The temperature dependence of $\Delta S/R$ required for the construction of an Ericsson cycle which satisfies the Carnot efficiency, namely, maximum efficiency, as shown in the $\Delta S/R$ versus T curve for the theoretical magnetic materials of FIG. 5, necessitates a constant magnetic entropy change $\Delta S/R$ for the magnetic materials. However, when these materials are assembled into actual refrigerators, the regeneration characteristics are liable to differ between high temperatures and low temperatures. For example, when the heat transfer characteristics are poor at low temperatures, it is desirable to use a material type for which $\Delta S/R$ becomes smaller at higher temperatures as shown in FIG. 6 in order to obtain a $\Delta S/R$ value which is acceptable. In the present invention, therefore, the expression "$\Delta S/R$ is constant or nearly constant" is intended to include such a case.

As described above, when a ferromagnetic substance, such as $ErAl_2$, is used independently, it is unable to satisfy the requirement that $\Delta S/R$ is constant or nearly constant. In order to solve this problem, the inventor has found that it is possible to attain the object of the invention by using magnetic compositions for magnetic refrigeration including at least three kinds of magnetic substances selected from the group consisting of specific compounds and solid solutions of Al and rare earth elements (abbreviated R'), such as Gd, Tb, Dy, Ho, and Er. The compositions may be a mixture of these magnetic substances and have a granular form or a sintered dense form, or may be constructed as multilayers, each layer composed of one of the at least three kinds of the above magnetic substances and having a granular form or a sintered dense form.

Magnetic substances represented by $R'Al_2$ include compounds such as $GdAl_2$, $TbAl_2$, $DyAl_2$, $HoAl_2$ and $ErAl_2$, and solid solution systems consisting of Al and two kinds of R' such as $Er_{1-x}Dy_x$, $Er_{1-x}Ho_x$, $Ho_{1-y}Dy_y$ and $Dy_{1-\delta}$. Further, in the above formula $0<x<1, 0<y<1$ and $0<\delta<0.2$. Thus, when two or more kinds of rare earth elements R' are included, the total number of atoms must satisfy the formula $R'Al_2$, as is the case when R' is one kind of rare earth element.

Magnetic substances represented by $R'_3Al_2$, include compounds having $R'$ selected from Gd, Tb, Dy, Ho and Er, such as $Ho_xDy_yTb_{3-(x+y)}Al_2$ wherein $x+y<3$, and the solid solution systems of at least two kinds of the above described rare earth elements. Thus, when two or more kinds of the above-described rare earth elements are included, the total number of atoms must satisfy the formula $R'_3Al_2$, as is the case when $R'$ is one kind of rare earth element.

Magnetic substances represented by $R'Al_{2-\delta}$ include $ErAl_{2.2}$, $HoAl_{2.2}$ and $Dy_{0.5}Ho_{0.5}Al_{2.2}$. Thus, when two or more kinds of rare earth elements are included, the total number of atoms must satisfy the formula $R'Al_{2+\delta}$, as is the case when $R'$ is one kind of rare earth element.

BRIEF DESCRIPTION OF THE DRAWING

Further objects and advantages of the present invention and the structure and operation of the magnetic refrigeration composition and magnetic refrigeration process will become apparent to those skilled in the art of magnetic refrigeration from the following description taken in conjunction with the drawing to which reference should be had for a better understanding of the invention and in which.

DESCRIPTION OF THE PREFERRED EMBODIMENTS

Figure 4:
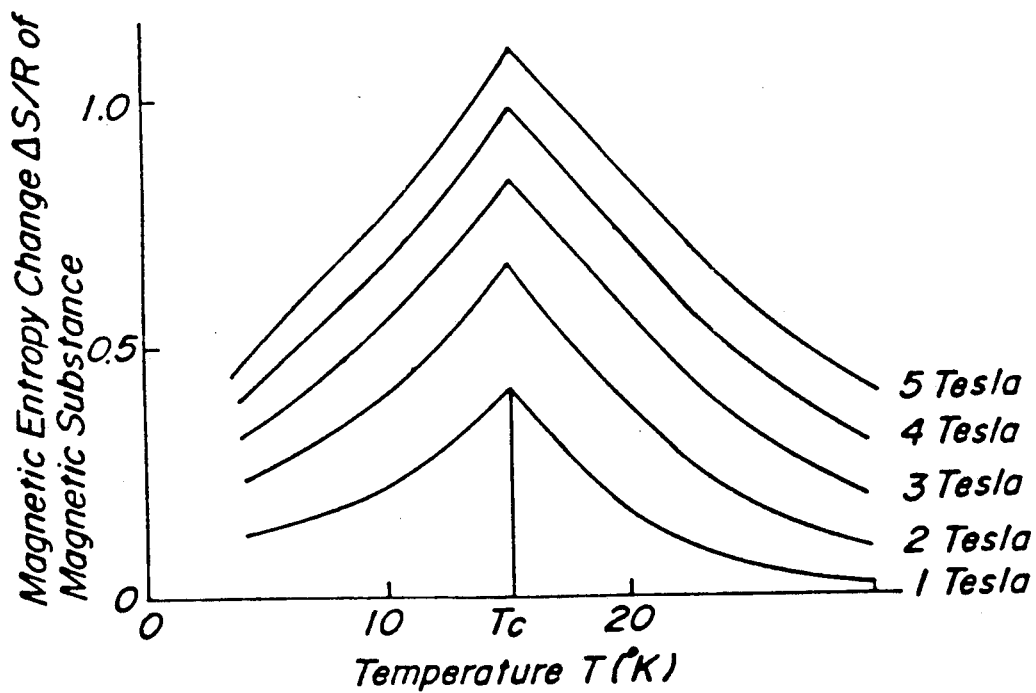
FIG. 4 is a graph of $\Delta S/R$ versus T curves for $ErAl_2$.
Figure 5:
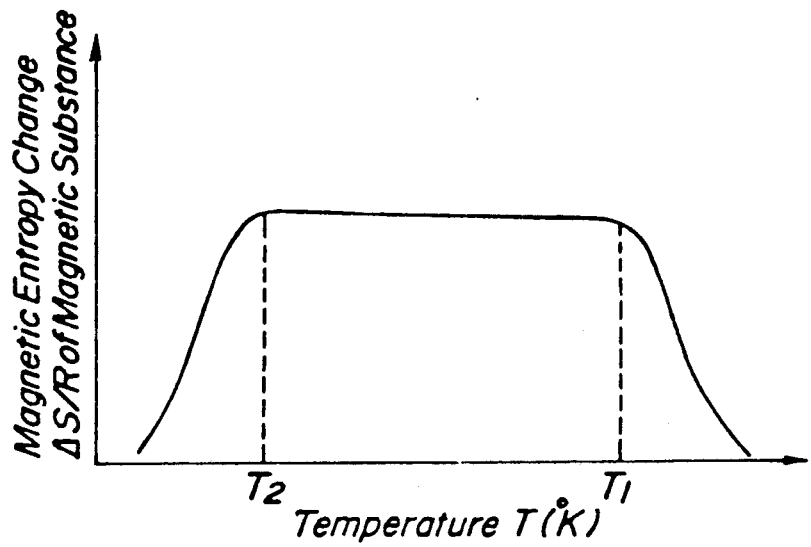
FIG. 5 and FIG. 6 are graphs of $\Delta S/R$ versus T curves for magnetic materials of the present invention.
Figure 6:
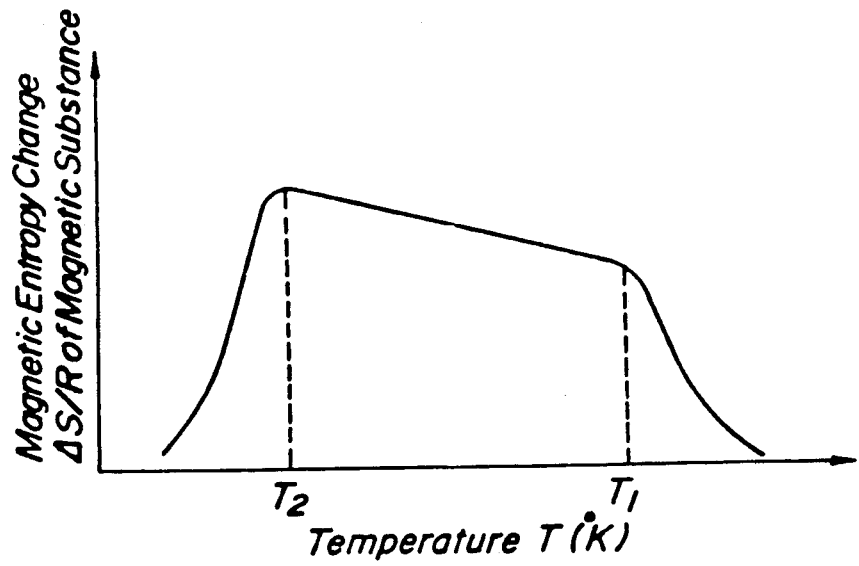

The principle of using the above $R'Al_2$, $R'_3Al_2$ and $R'Al_{2-\delta}$ as the magnetic materials for magnetic refrigeration of the present invention is that combinations of these substances are able to satisfy the requirement that $\Delta S/R$ be constant or nearly constant in the high temperature region ranging from above about 20° K. to about 77° K. as shown in FIG. 5 and FIG. 6. As described in FIG. 4, a single magnetic substance, such as $ErAl_2$, is unable to satisfy the requirement that $\Delta S/R$ be constant, however, it is important that $\Delta S/R$ is maximum at the Curie temperature $T_C$. From this fact, when magnetic substances having a $T_C$ distributed suitably in the desired range of temperatures are mixed or layered together, the requirement that $\Delta S/R$ be constant as shown in FIGS. 5 and 6 is satisfiable.

Figure 7:
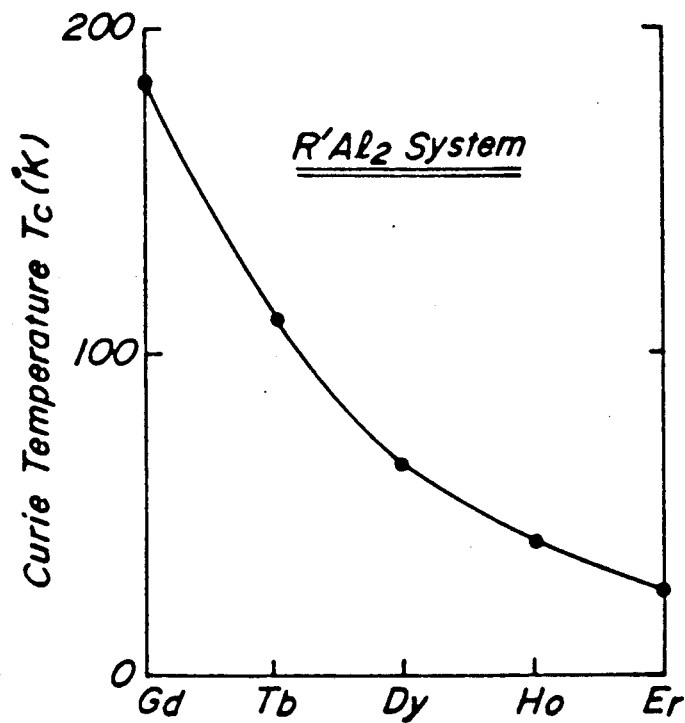
FIG. 7 and FIG. 8 are graphs of $T_C$ changes caused by rare earth elements in compounds of the $R'Al_2$ system and the $R'_3Al_2$ system, respectively.
Figure 8:
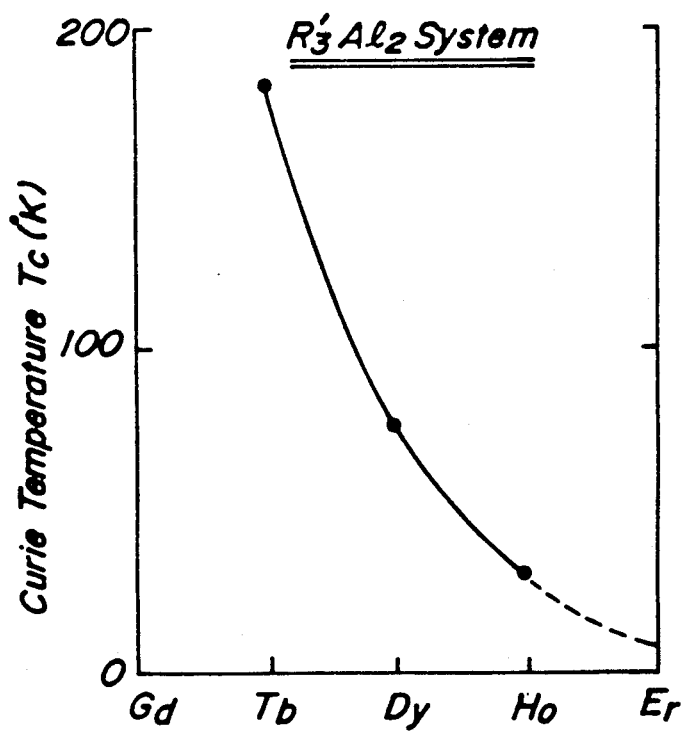
Figure 9:
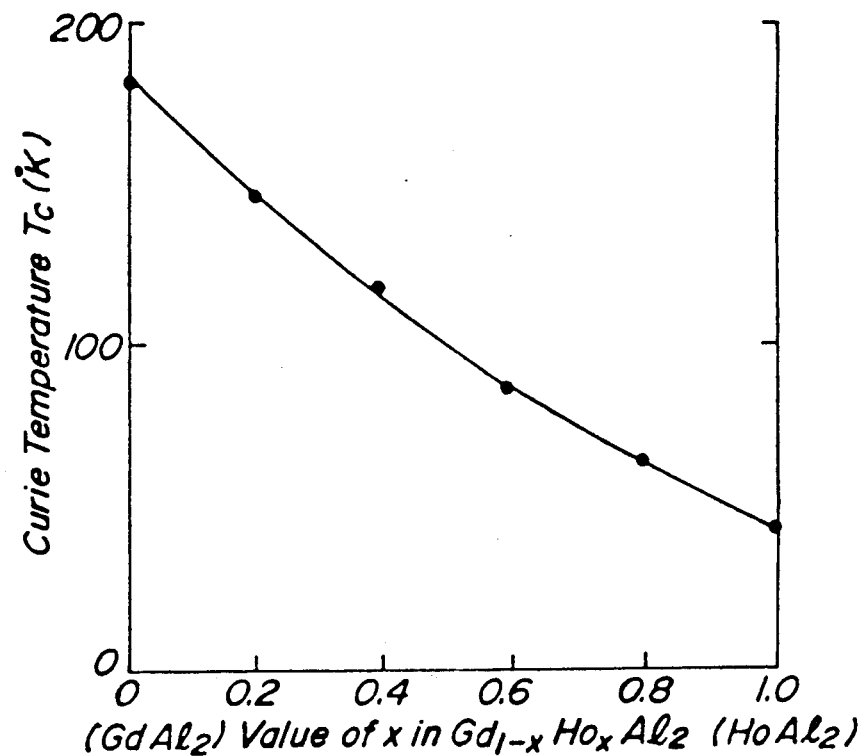
FIG. 9 is a graph showing the relationship between the composition of $Gd_{1-x}Ho_xAl_2$ and $T_C$.

Therefore, magnetic substances having any $T_C$ in the region of high temperatures are sought. In the present invention, as shown in FIG. 7, $T_C$ changes of an $R'Al_2$ system consisting of $R'$ components selected from Gd, Tb, Dy, Ho and Er are used. By the present method, Curie temperatures which change stepwise over a wide range of temperatures are obtained. Similarly, for an $R'_3Al_2$ system, $T_C$ changes are obtained over a wide range of high temperatures as shown in FIG. 8. It was also confirmed that each $T_C$ of $R'Al_2$ in FIG. 7 and $R'_3Al_2$ in FIG. 8, such as the $T_C$ between $GdAl_2$ and $HoAl_2$, was variable continuously with changes in the value of x in the solid solution represented by the formula $Gd_{1-x}Ho_xAl_2$, wherein $0<x<1$ as shown in FIG. 9.

It was also confirmed that a nearly constant $\Delta S/R$ was obtained for magnetic materials comprising at least three kinds of materials having different Curie temperatures in the desired high temperature region. For example, magnetic materials comprising three kinds of materials represented by the formula:

$$(ErAl_2)_a (Er_{0.5}Dy_{0.5}Al_2)_b (DyAl_2)_c \qquad (1),$$

that is to say, $ErAl_2$, $Er_{0.5}Dy_{0.5}Al_2$ and $DyAl_2$ having mole fractions a, b and c, provide $\Delta S/R$ curves as shown in FIGS. 5 and 6 when $0.1<a$, $b<0.5$ and $0.4<c<0.7$, while $a+b+c=1$. When a, b and c deviate from the above values, $\Delta S/R$ curves as shown in FIGS. 5 and 6 are not obtained, so that the drop in refrigeration efficiency of the magnetic refrigerators becomes remarkable.

Magnetic materials having a nearly constant $\Delta S/R$ curve between 30° K. and 77° K., as obtained in FIGS. 5 and 6, include powdered and sintered mixtures of magnetic materials having three Tc values, the mixtures being represented by the formula:

$$(HoAl_2)_{0.22}(Ho_{0.5}Dy_{0.5}Al_2)_{0.2}(DyAl_2)_{0.58}.$$

Figure 10:
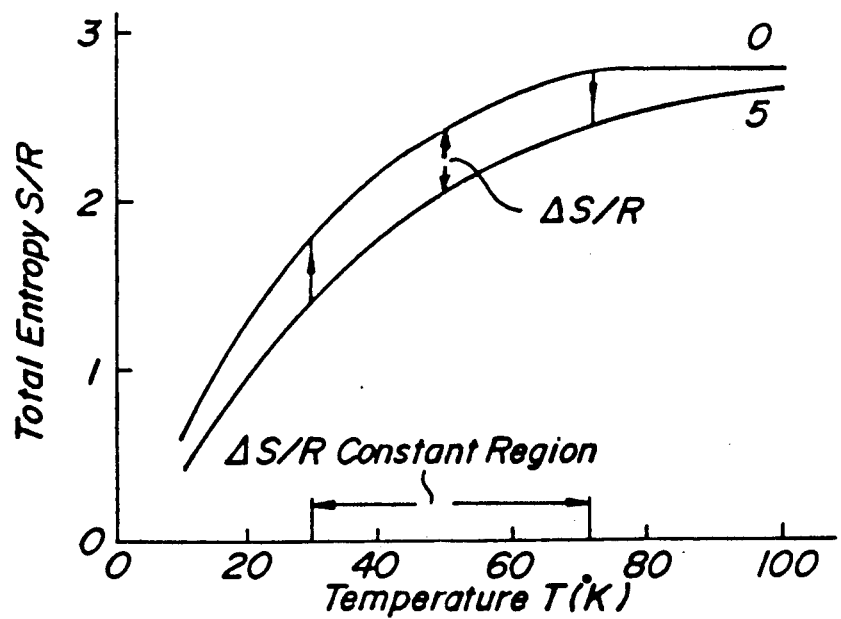
FIG. 10 is a graph showing the reverse Ericsson cycle for magnetic materials of the present invention.

By using this fact, an Ericsson cycle of the 30° K. to 77° K. region, shown in FIG. 10 as total entropy S/R versus temperature T(°K.) is obtained which substantially approximates Carnot cycle efficiency. A magnetic field of 5 teslas was employed.

For the $R'Al_2$ and $R'_3Al_2$ systems above, cooling is attained at a temperature of about 20° K. and, in order to lower the temperature, good results are obtained by making a solid solution $ErAl_{2+\delta}$, between $ErAl_2$ and $ErAl_3$, having a predominantly antiferromagnetic interaction and using the solid solution instead of $ErAl_2$. In this solid solution, $\delta$ is less than 0.2, and, preferably, $\delta$ is 0.01-0.2.

Preferred examples of magnetic materials for the present invention are, if these are limited to a 20°-77° K. $R'Al_2$ system, the following magnetic substances:

mixtures (2) and (3), each having three kinds of magnetic substances,

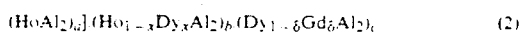 (2)

wherein a, b and c are mole fractions $(a+b+c=1)$ which satisfy the inequalities $0.1 < a$, $b < 0.5$, and $0.4 < c < 0.7$, and wherein $0 < x < 1$ and $0 < \delta < 0.2$; and

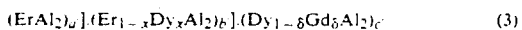 (3)

wherein a', b' and c' are mole fractions $(a'+b'+c'=1)$ which satisfy the inequalities $0.1 < a'$, $b' < 0.5$, and $0.4 < c' < 0.7$, and wherein $0 < x < 1$ and $0 < \delta < 0.2$.

Mixture (4) of four kinds of magnetic substances,

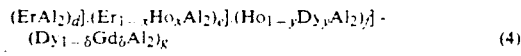 (4)

wherein d, e, f and g are mole fractions $(d+e+f+g=1)$ which satisfy the inequalities d, e and $f < 0.1$, $g < 0.7$, and wherein $0 < x < 1.0 < y < 1$ and $\delta < 0.2$.

When the cooling temperature region is reduced, magnetic materials may be used such as

 (5)

wherein and a, b and c mole fractions $(a+b+c=1)$ which satisfy the inequalities $0.1 < a$, $b < 0.5$ and $0.4 < c < 0.7$.

Figure 1:
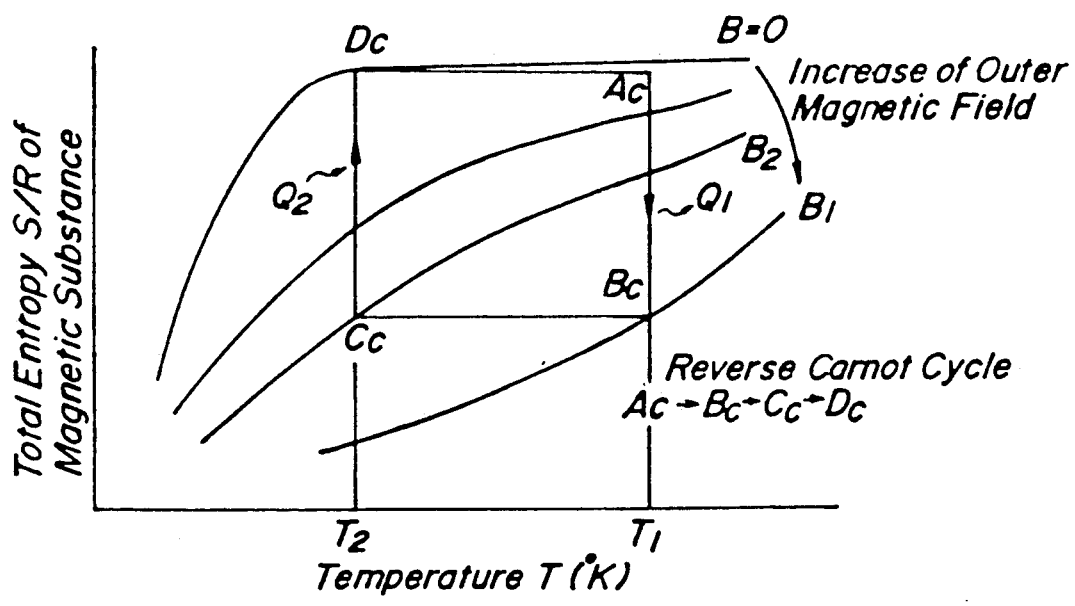
FIG. 1 is a graph of a magnetic refrigeration cycle of the reverse Carnot type, utilizing in magnetic refrigeration, the region of low temperatures.
Figure 11:
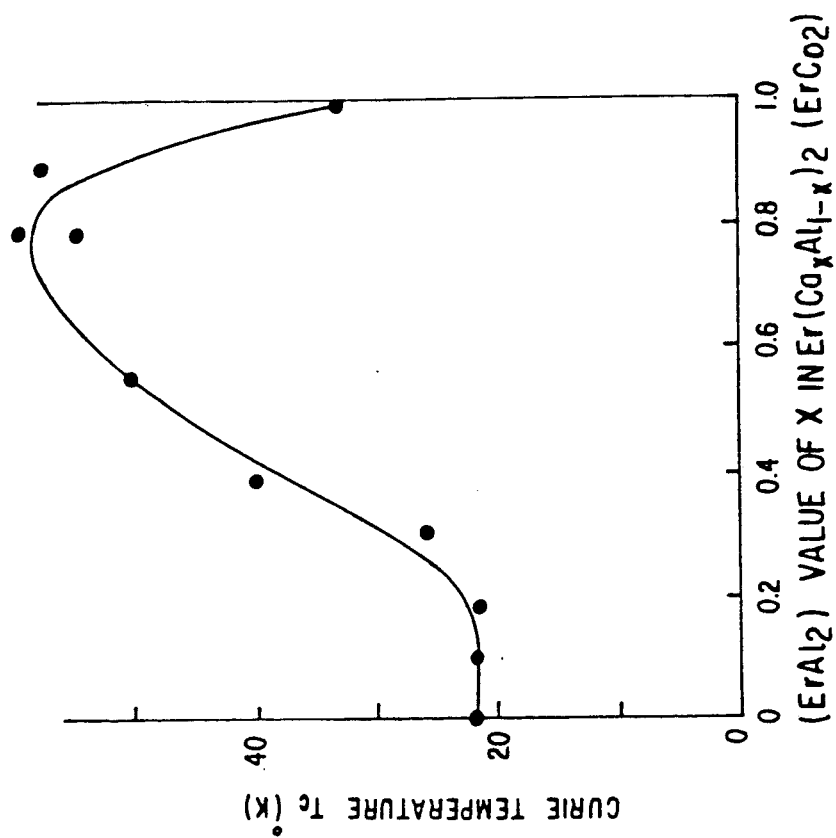
FIG. 11 is a graph showing the relationship between the composition of $Er(Co_xAl_{1-x})_2$ and $T_C$.
Figure 2:
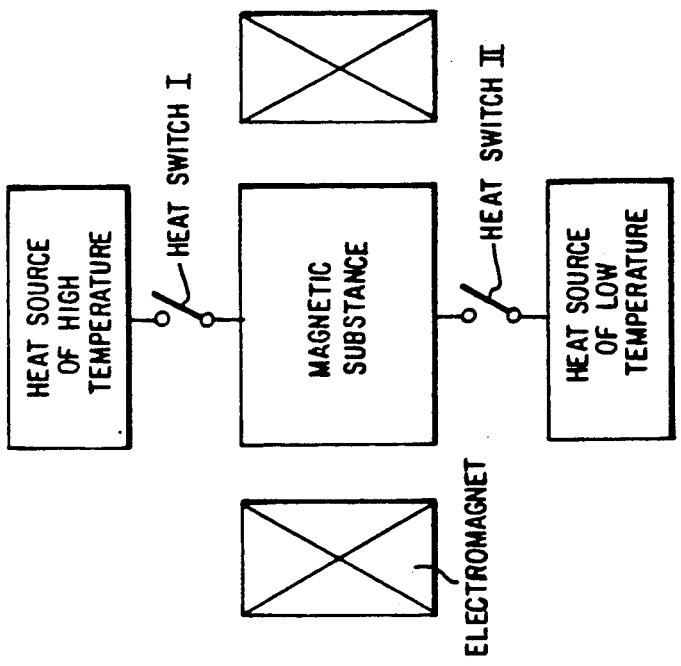
FIG. 2 is a block diagram showing the principle of operation of a magnetic refrigerator using the reverse Carnot cycle.
Figure 3:
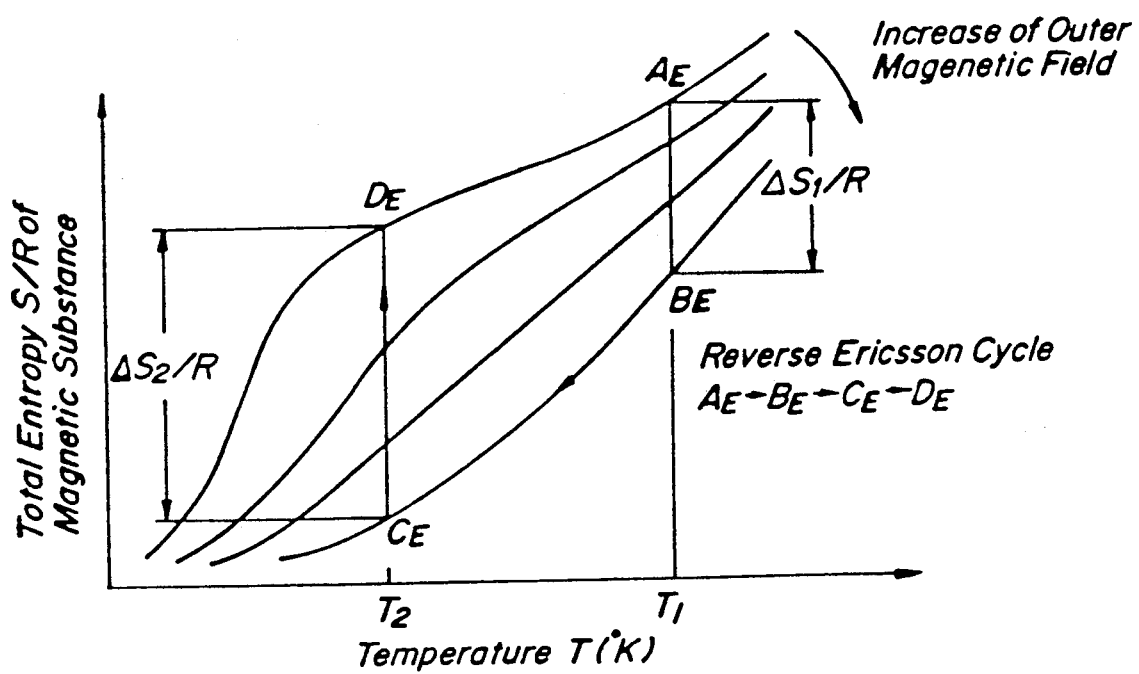
FIG. 3 is a graph of a magnetic refrigeration cycle of the reverse Ericsson type, using in magnetic refrigeration, the region of low temperatures.

Furthermore, when Fe, Ni and/or Co metals of Group VIII of the Periodic Table are mixed into an $R'Al_2$ or an $R'_3Al_2$ system, the $T_C$ in the original system may be continuously changed (generally raised) in proportion to the added amount. For example, as shown in FIG. 11, when Co is added into $ErAl_2$, namely for $Er(Co_xAl_{1-x})_2$, the $T_C$ increases continuously until the Co value of x becomes 0.8 mole. For $R'_3Al_2$, it increases in a manner similar to that above.

As described above, it may be understood that magnetic materials usable for magnetic refrigerators having a refrigeration initiation temperature in the high temperature region, especially 77° K., are obtained by using magnetic materials containing at least three kinds of magnetic substances selected from the group consisting of $R'Al_2$, $R'_3Al_2$ and $R'Al_{2-\delta}$.

In order to obtain mixed and sintered bodies, the above magnetic substances in particulate or powdered form are mixed and sintered. The grain sizes preferably range between a few $\mu m$ to several tens of $\mu m$, but are not limited to these sizes.

Figure 12:
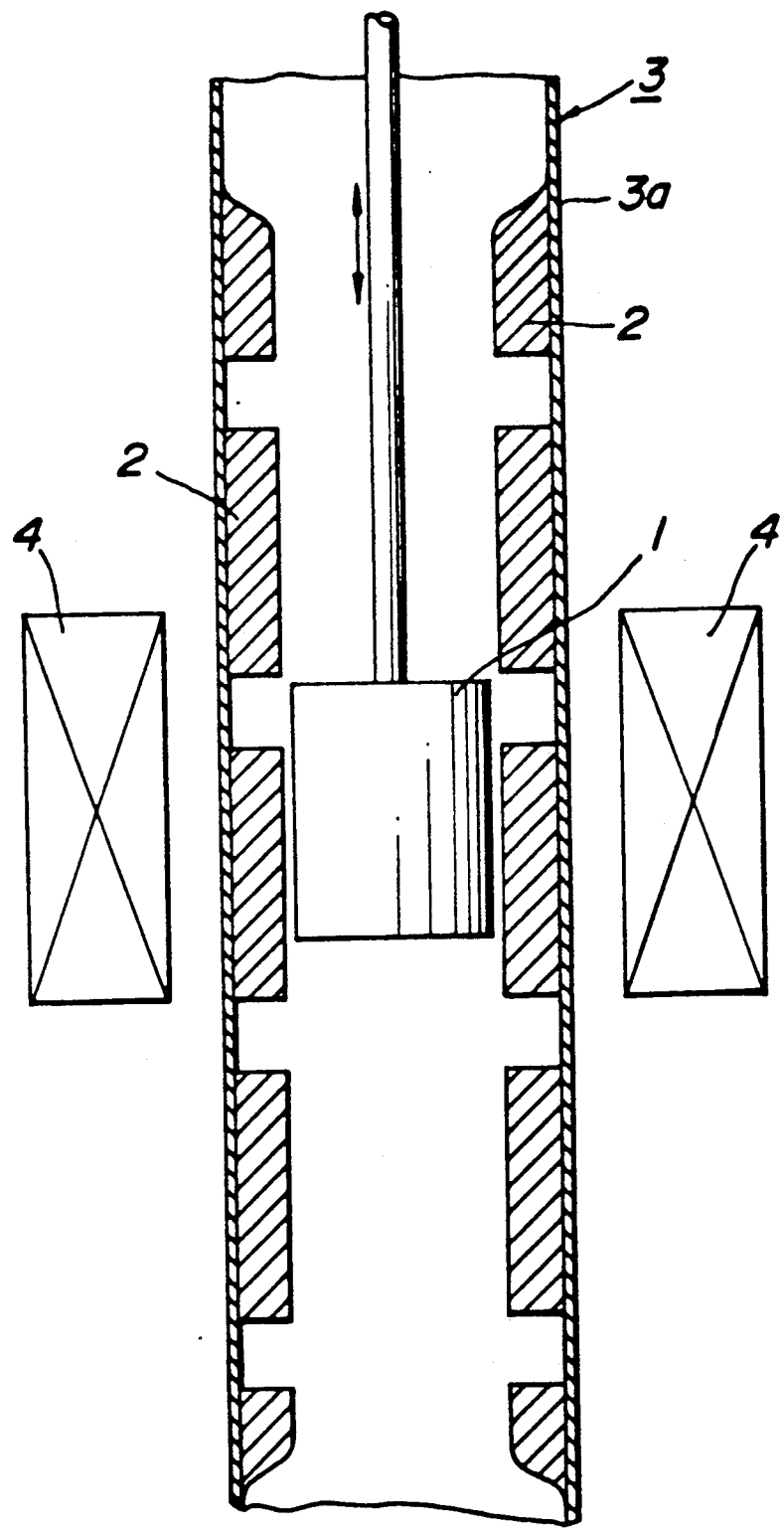
FIG. 12 is a cross-sectional view of a composition comprising regenerators for magnetic refrigeration in the high temperature region by using magnetic materials of the mixed type of the present invention.

When such magnetic materials are actually used for magnetic refrigerators, two types of magnetic refrigerators are possible. One type utilizes a regenerator and at least three kinds of mixed particulate or powdered magnetic substances placed in a vessel or produced as a single dense body by sintering and referred to herein as magnetic materials of a mixed type. For example, as shown in FIG. 12, a mixed and sintered magnetic material 1 of the mixed type is provided, and is arranged to move up and down within an empty central core defined by regenerators 2, which regenerators 2 have a space between adjacent regenerators 2, and an insulating wall 3. An electromagnet 4 is provided outside the insulating wall 3 and is used to transfer heat between the magnetic materials and the regenerators.

Figure 13:
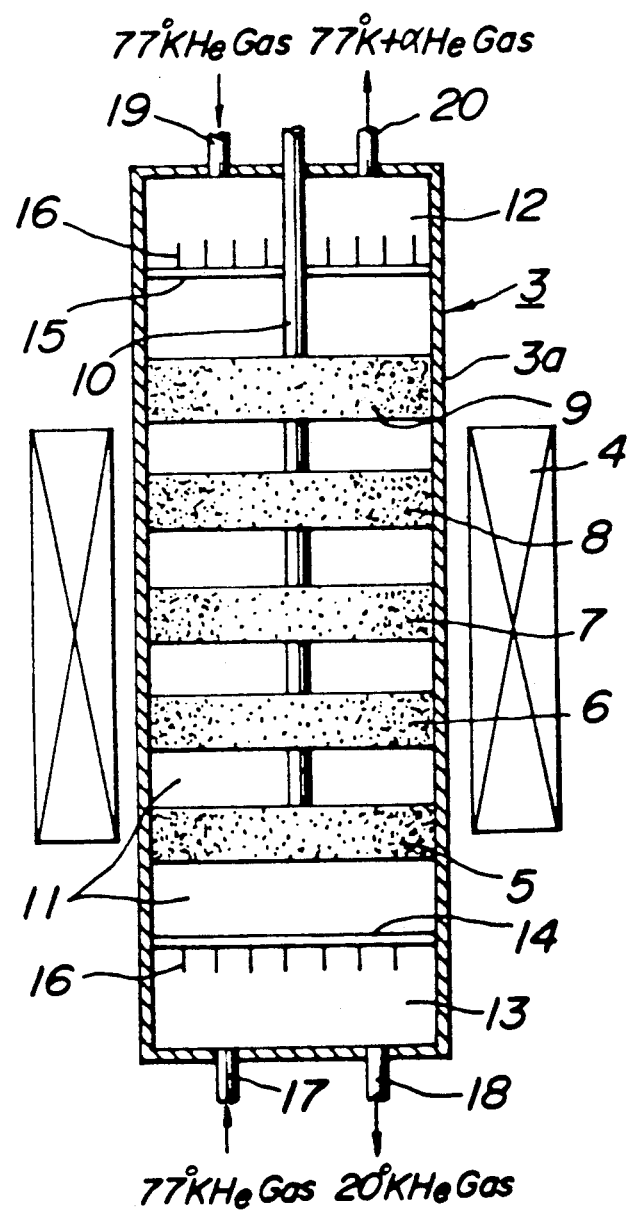
FIG. 13 and FIG. 14 are cross-sectional views illustrating heat exchangers for magnetic refrigeration in the high temperature region using magnetic materials of the multilayered type which are spaced apart and stacked, respectively.

Another type of magnetic refrigerator utilizes heat exchange and actually uses the magnetic materials. Without mixing these at least three kinds of magnetic substances, each magnetic substance in particulate or powdered form is contained in a vessel as layers, respectively. Alternately, these particulate or powdery magnetic substances are each made into a porous single layer by sintering and referred to as magnetic materials of a multilayer type, and assembled so as to define gas passages. For example, as shown in FIG. 13, a multilayered composition consisting of a first layer 5, a second layer 6, a third layer 7, a fourth layer 8 and a fifth layer 9 arranged in bottom to top order of $ErAl_2$, $Dy_xEr_{1-x}Al_2$, $Dy_yEr_{1-y}Al_2$, $Dy_zEr_{1-z}Al_2$ and $DyAl_2$, respectively, wherein $0 < x < y < z < 1$ and $0 < x < 1$, and having Curie temperatures $T_C$ which increase successively so that $T_C$ increases from the first layer 5 to the fifth layer 9 and preferably ranges up to 77° K. Each layer has a mole ratio with respect to the total multilayered composition which is X, Y, Z, U and V, respectively, and the mole ratios range from 1 to less than 3, that is, the inequalities $1 \leq X \leq Y \leq Z \leq U \leq V \leq 3$, are satisfied when $X=1$.

For example, the layers may be arranged as follows: $ErAl_2$, $Dy_{0.25}Er_{0.75}Al_2$, $Dy_{0.5}Er_{0.5}Al_2$, $Dy_{0.75}Er_{0.25}Al_2$; and $DyAl_2$, and have mole ratios X, Y, Z, U, and V, respectively. For these five layers, the layers are arranged by mole ratio as follows: X, Y, Z, U, and V, and the mole ratios thereof satisfy the inequalities $1 \leq X \leq Y \leq Z \leq U \leq V \leq 3$; and when $X=1$. Further, each magnetic substance has a $T_C$ identified as $T_{CX}$, $T_{CY}$, $T_{CZ}$, $T_{CU}$, $T_{CV}$, so as to increase successively in $T_C$ from the first layer ($ErAl_2$, for example) to the fifth layer so that $T_{CX} < T_{CY} < T_{CZ} < T_{CU} < T_{CV} \leq 77°$ K. In the above range, heat exchanger abilities are fully exhibited even for embodiments in which heat exchange abilities between high Curie temperature layers and low Curie temperature layers are somewhat different. Beyond the above range, heat exchanger abilities become insufficient. When the heat exchange abilities are the same or extremely close between high Curie temperature layers and low Curie temperature layers, preferable mole ratios satisfy $1 < X \leq Y \leq Z \leq U \leq V \leq 2$ and when $X=1$.

The particle sizes of the particulate or powdery magnetic substances forming each layer will differ in accordance with the construction and operating conditions of the magnetic refrigeration device Thus, while not having definable limits, the particle sizes should be large enough to define gas passages. When the multilayered composition is composed of sintered layers, each layer is a porous plate defining therein gas passages, for example, for He gas, having pore sizes of a few $\mu m$ to several tens of $\mu m$.

Further, if necessary, one or more layers of the above multilayered composition, each containing one of the at least three kinds of magnetic substances, can be replaced by particulate mixtures or sintered bodies of the mixed type containing at least two kinds of substances selected from the above described at least three kinds of substances In this case, it is also possible to arrange each layer in the order of low to high $T_C$ and preferably also in the order of increasing mole ratio.

FIG. 13 shows a device for making a heat exchanger using magnetic materials of the present invention. Each layer 5-9 described previously in the foregoing is fixed not to move, for example, by a fixing bar 10. A tank 3, vertically movable above and below the layers of the inventive composition, is constructed of heat insulating walls 3a, and electromagnets 4 are provided outside of tank 3. Above the top of the magnetic substance layer 9 and below the bottom of the magnetic substance layer 5, an upper heat transfer plate 15 and a lower heat transfer plate 14 are provided, respectively, and peripheral edges of each heat transfer plate 14, 15 are adhered to inner walls of the tank 3. Middle gas rooms 11 are provided between these heat transfer plates 14 and 15, an upper gas room 12 is provided between the heat transfer plate 15 and a cover plate of the tank 3 and a lower gas room 13 is provided between the heat transfer plate 14 and a bottom plate of the tank 3. Fins 16 are provided on the surfaces of heat transfer plates 15, 14 which face the upper and lower gas rooms 12 and 13, respectively, to enhance the heat transfer effect. He gas is charged in the middle gas rooms 11, and the gas moves up and down with the movement of the tank 3 through pores or passages in the magnetic material of each layer. The movement is achieved in equal magnetic fields after the magnetic materials of the layers are magnetized or demagnetized by magnets, so that ascending He gas absorbs the heat generated by the magnetization and the heat is transmitted into the upper gas room 12 through the upper heat transfer plate 15. In the upper gas room 12, He gas of 77° K., cooled by liquid nitrogen enters through an entrance 19 into the tank and the heat of the heat transfer plate 15 is removed through exit 20. Then, when the tank is moved downwards after demagnetization, He gas cooled to 77° K. by the upper heat transfer plate 15, is further cooled to 20° K. in the middle gas rooms 11 through each demagnetized layer, and the gas reaches the lower heat transfer plate 14 so that He gas of 77° K. entering the lower gas room 13 through entrance 17 is cooled to 20° K. and exits through exit 18. Such operations are repeated.

Figure 14:
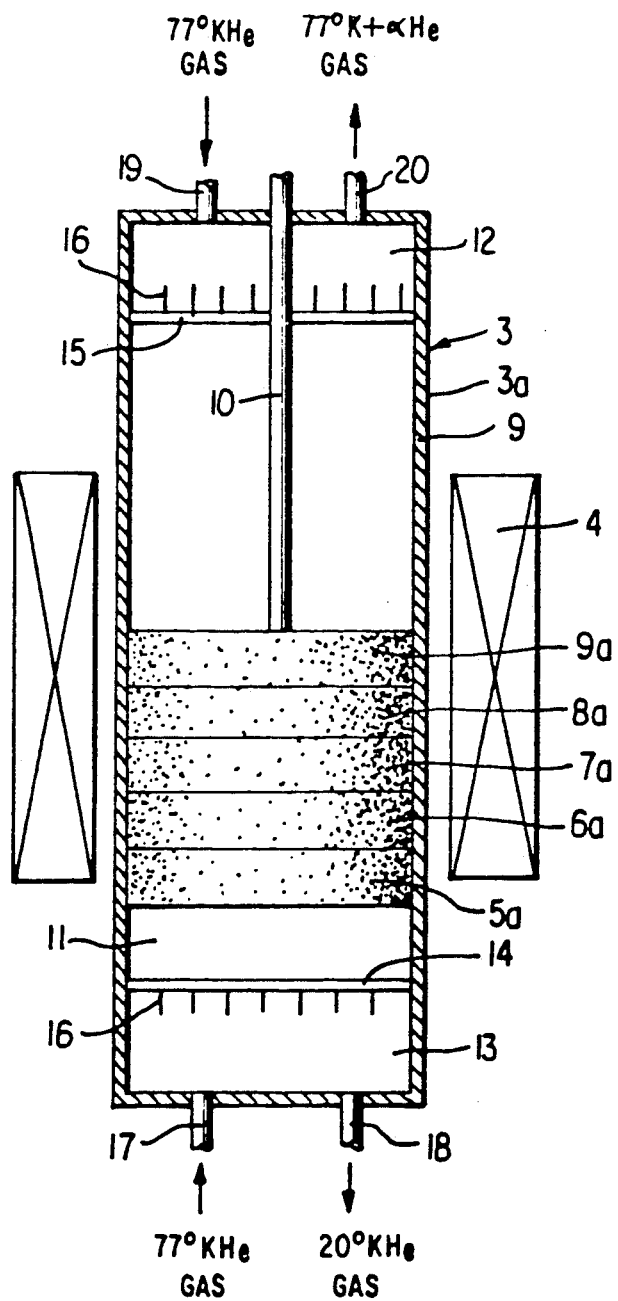

In FIG. 14a, layers 5-9 are shown arranged serially and in contact with one another, rather than having middle gas rooms 11 therebetween.

In magnetic materials of the multilayer type, as well as magnetic materials of the mixed type, $T_C$ and the quantity (for example, measured by the thickness) of the materials constituting each layer are selected to have mole ratios X, Y, Z, ..., N for which $1 \leq X \leq Y \leq Z, ..., \leq N < 3$, when $X = 1$. N is the mole ratio for the Nth kind of said at least three kinds of magnetic substances. Preferably each layer is arranged in the order of increasing mole ratio and increasing $T_C$, i.e., $T_{CX} < T_{CY} < T_{CZ}, ..., T_{CN}$, where $T_{CN}$ is the Curie temperature for the Nth kind of said at least three kinds of magnetic substances, so that the demand of constant $\Delta S/R$, as shown in FIG. 5 and FIG. 6, may be satisfied and good efficiency may be obtained in the magnetic refrigerator.

Alternately, a multilayer type of may be constructed having at least three layers consisting of a combination of at least three magnetic substance layers each. In particular it is preferable to have five to six layers. When the quantity of magnetic material in each layer is suitably chosen, the preferable constant $\Delta S/R$ is obtained. A preferable construction of layers is for example, the above described five layers. Further, layers containing one of at least four kinds of magnetic substances in the following combinations are preferable:

layers containing one of at least four kinds of magnetic substances represented by the formulae

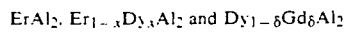

wherein $o < x < 1$ and wherein the layer is arranged by increasing mole ratios X, Y, Z, U and in order of low to high Curie temperatures $T_{CX}$, $T_{CY}$, $T_{CZ}$ and $T_{CU}$ respectively, and wherein $1 \leq X \leq Y \leq Z \leq U < 3$ when $X = 1$;

layers containing one of at least four kinds of magnetic substances represented by the formulae

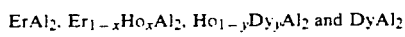

wherein $o < x < 1$ and $O < \delta < 0.2$ and wherein the layers are arranged by mole ratios of X, Y, Z, U and in order of low to high Curie temperatures, and wherein $1 \leq X \leq Y \leq Z \leq U < 3$ when $X = 1$; and layers containing one of at least four kinds of magnetic substances represented by the formulae,

wherein $o < x < 1$ and $0 < y < 1$, and wherein the layers are arranged by increasing mole ratios of X, Y, Z, U, and in order of low to high Curie temperatures, and wherein $1 \leq X \leq Y \leq Z \leq U < 3$ when $X = 1$.

EXAMPLE 1 AND COMPARATIVE EXAMPLES 1 AND 2

Powders of three element systems $HoAl_2$, $Ho_{0.5}Dy_{0.5}Al_2$ and $DyAl_2$ were mixed so as to result in compositions having mole fractions a, b and c (where $a+b+c=1$), as described below, and were molded and sintered, so that three samples of mixed sintered bodies were obtained, each represented by the formula:

| | | | | |
|---|---|---|---|---|
| Example 1 | A | 0.22 | 0.2 | 0.58 |
| Comparative Example 1 | B | 0.07 | 0.23 | 0.69 |
| Comparative Example 2 | C | 0.38 | 0.35 | 0.27 |

Figure 15:
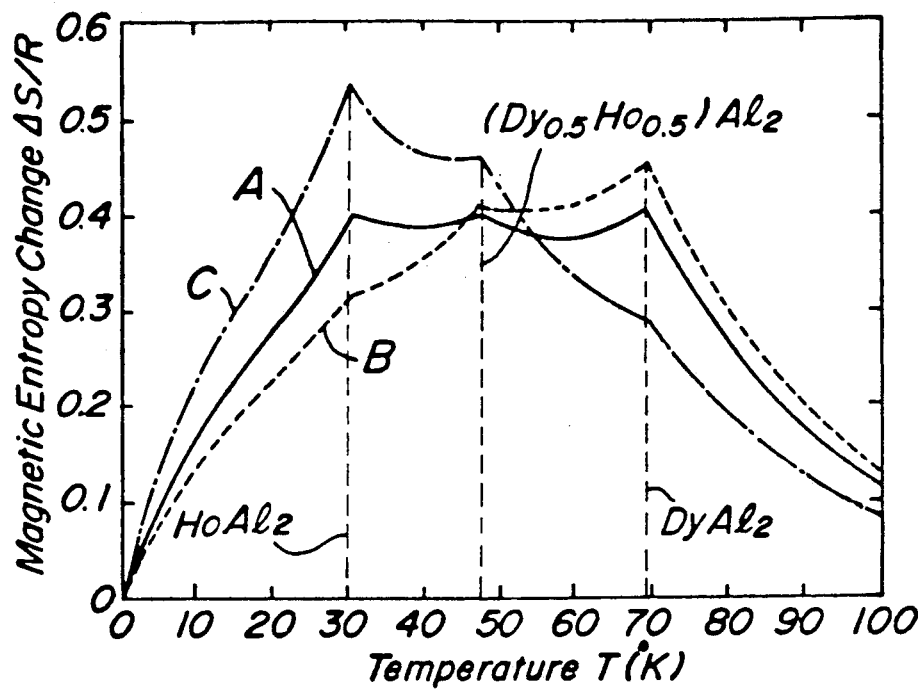
FIG. 15 and FIG. 16 are graphs of $\Delta S/R$ versus T curves for magnetic materials of the mixed type according to the present invention and comparative examples.

Magnetic entropy change $\Delta S/R$ versus T curves for the three samples A, B, C, are shown in FIG. 15. This figure shows the result obtained when a magnetic field of five teslas is applied.

In the measurement of $\Delta S/R$, first, the specific heat of these magnetic materials in the magnetic field was determined, a part of the lattice specific heat was deducted from the specific heat, and the magnetic specific heat $C_M$ was obtained. Next, $\Delta S/R$ was calculated by the following equation of $C_M$ and $\Delta S/R$:

$$\Delta S/R = \frac{1}{R} \int_0^T \frac{C_M}{T} dt.$$

$\Delta S/R$ of inventive sintered body A, having mole fractions a, b and c ($a+b+c=1$) satisfying the inequalities according to the invention $0.1 < a$, $b < 0.5$ and $0.4 < e < 0.7$, is substantially constant within the high temperature region of about 30°-70° K., while $\Delta S/R$ of comparative sintered bodies B and C having a, b and c not satisfying the above inequalities is not constant.

EXAMPLE 2 AND COMPARATIVE EXAMPLES 3 AND 4

Figure 16:
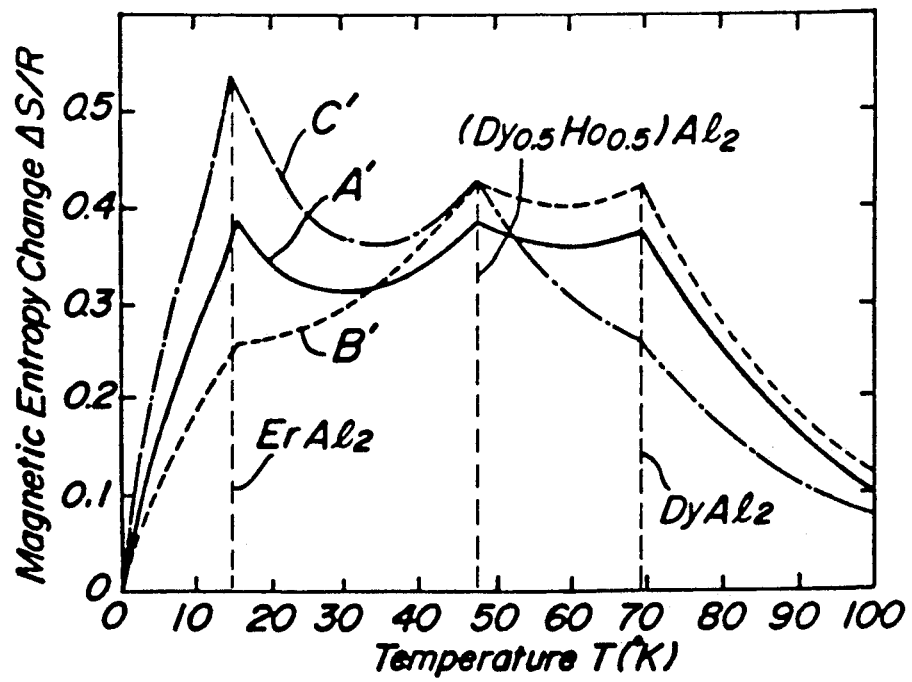

Three element systems $HoAl_2$, $Ho_{0.5}Dy_{0.5}Al_2$ and $DyAl_2$ were mixed, molded and sintered in the same manner as Example 1 to result in compositions having mole fractions of a', b' and c' (where $a'+b'+c'=1$) as described below. Magnetic entropy change $\Delta S/R$ versus T curves for of the three samples A', B', C' are shown in FIG. 16. ΔS/R was determined in a similar manner as described in Example 1. The three samples of mixed sintered bodies are each represented by the formula previously given in Example 1.

|  |  | a | b | c |
|---|---|---|---|---|
| Example 2 | A' | 0.21 | 0.27 | 0.52 |
| Comparative Example 3 | B' | 0.08 | 0.32 | 0.60 |
| Comparative Example 4 | C' | 0.33 | 0.44 | 0.22 |

As shown in FIG. 16, ΔS/R of inventive sintered body A', having mole fractions a', b' and c' (a'+b'+c'=1) satisfying the inequalities according to the invention $0.1 < a'$, $b' < 0.5$ and $0.4 < c' < 0.7$, is substantially constant within the high temperature region of about 15°–77° K., while ΔS/R of comparative sintered bodies B' and C' having a', b' and c' not satisfying the above inequalities is not constant.

EXAMPLE 3

In four element systems $ErAl_2$, $HoAl_2$, $Ho_{0.5}Dy_{0.5}Al_2$ and $DyAl_2$, samples represented by the formula

Figure 17:
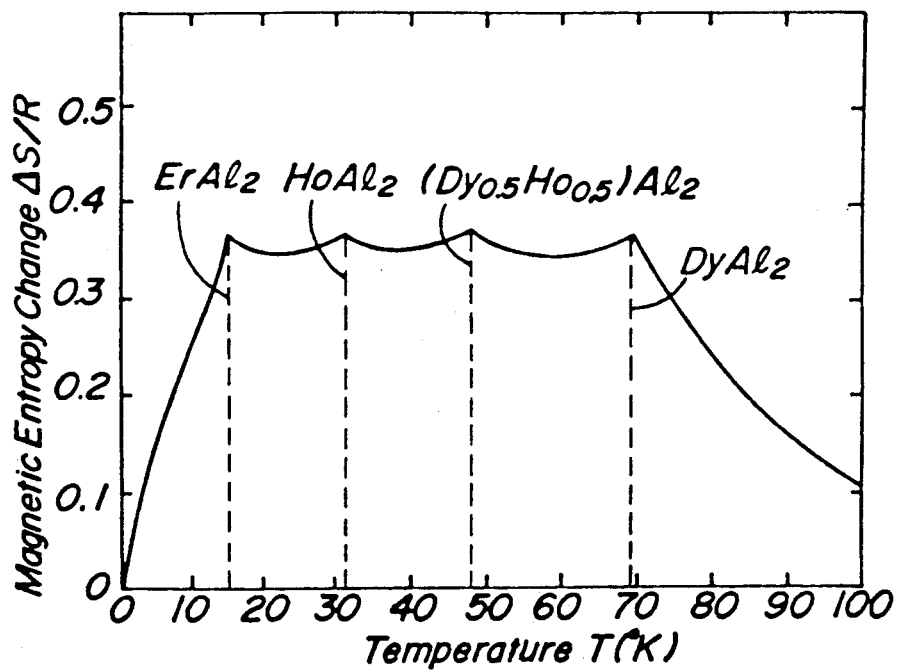
FIG. 17 is a graph showing $\Delta S/R$ versus T curves for magnetic materials of another example of the present invention.

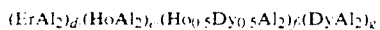
$(ErAl_2)_d(HoAl_2)_e(Ho_{0.5}Dy_{0.5}Al_2)_f(DyAl_2)_g$ were produced in the same manner as in Example 1. The optimum composition mole fraction ratio according to the invention was represented by d:e:f:g = 0.16:0.17:0.20:0.47 and d+e+f+g=1. Magnetic entropy change ΔS/R versus T curves for the obtained magnetic materials are shown in FIG. 17. Constant ΔS/R is obtained within the high temperature region of about 15°–70° K.

EXAMPLE 4

By use of magnetic materials of the multilayered type consisting of four layers, the first to the fourth layers are constucted from bottom to top in the same manner as shown in FIG. 13, except that the fifth layer 9 is omitted. Each layer is produced by weighing particles of the following compounds and solid solutions in mole ratios as described below, and then molding and sintering them into a porous plate. In these mole ratios, the value of the first layer is estimated at 1.

|  |  | mole ratio |
|---|---|---|
| 1st layer | $ErAl_2$ | 1 |
| 2nd layer | $HoAl_2$ | 1.29 |
| 3rd layer | $Ho_{0.5}Dy_{0.5}Al_2$ | 1.59 |
| 4th layer | $DyAl_2$ | 1.92 |

According to such a four layer construction, the ΔS/R of the magnetic substances exchanging heat with He gas in the high temperature region of 77°–20° K. becomes substantially constant, and magnetic materials of the multilayer type are advantageously heat exchanged by He gas passage from bottom to top or from top to bottom alternately, so that efficient magnetic refrigeration is achieved in this region. In the three layer construction, the efficiency is lowered.

EXAMPLE 5

By use of five layers as illustrated in FIG. 13, layers are prepared of compounds or solid solutions, and the composition has mole ratios as described below.

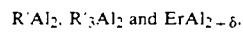

|  |  | mole ratio |
|---|---|---|
| 1st layer | $ErAl_2$ | 1.0 |
| 2nd layer | $ErHo_{0.5}Dy_{0.5}Al_2$ | 1.16 |
| 3rd layer | $HoAl_2$ | 1.29 |
| 4th layer | $Ho_{0.5}Dy_{0.5}Al_2$ | 1.59 |
| 5th layer | $DyAl_2$ | 1.92 |

In this case, the mole ratio of the first layer is estimated at 1. The five layer construction is prepared in the same manner as Example 4, and better results are obtained than for the four layer construction.

As mentioned above, use of magnetic materials for magnetic refrigeration comprising at least three kinds of magnetic substances selected from the group consisting of magnetic substances having the above specified formula $R'Al_2$, $R'_3Al_2$ and $R'Al_{2-\delta}$, or a combination of layers, each containing one kind of at least three kinds of the said magnetic materials, makes it feasible to keep ΔS/R constant or substantially constant in the high temperature region having a cooling initiation temperature of 77° K., so that remarkable efficiency can be achieved by use of a magnetic refrigerating cycle of the Ericsson type in this region compared with a refrigerating cycle utilizing conventional magnetic materials having variable ΔS/R.

The present disclosure relates to the subject matter disclosed in Japan Patent Application 60,872/84, filed Mar. 30th, 1984, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A magnetic refrigeration composition for magnetic refrigeration comprising at least three kinds of magnetic substances selected from the group consisting of magnetic substances having the formulae $R'Al_2$, $R'_3Al_2$ and $ErAl_{2-\delta}$, wherein R' is at least one element selected from the group consisting of Tb, Dy, Ho and Er, provided that the total number of atoms satisfies the above formulae respectively, and $0 < \delta < 0.2$, said composition being a multilayered composition of said magnetic substances present in mole ratios for each kind of X, Y, Z, . . . , N, respectively, where N is the mole ratio of the Nth kind of said at least three kinds of magnetic substances and where the mole ratios range from 1 to less than 3, each layer of said multilayered composition consisting of one kind of said at least three kinds of magnetic substances and each layer consisting of a different kind of said at least three kinds of magnetic substances, and each kind of said at least three kinds of magnetic substances having a Curie temperature $T_C$ which is different from that of the other kinds and is given by $T_{CX}$, $T_{CY}$, $T_{CZ}$, . . . , $T_{CN}$, respectively, where $T_{CN}$ is the Curie temperature of the nth kind of said at least three kinds of magnetic substances, and the layers being arranged in the order of low to high Curie temperature.

2. A composition as claimed in claim 1, wherein the magnetic substances are sintered whereby each layer is a sintered layer and is porous.

3. A composition as claimed in claim 2, wherein each layer consists of one kind of at least four kinds of magnetic substances selected from the group of magnetic substances having the formulae

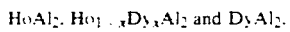

wherein $0<x<1$ wherein each layer has a different Curie temperature $T_C$ given by $T_{CX}$, $T_{CY}$, $T_{CZ}$, $T_{CU}$, ..., $T_{CN}$ respectively, and $T_{CX}<T_{CY}<T_{CZ}<T_{CU}$, ..., $<T_{CN} \leq 77°$ K., and wherein each layer has a mole ratio with respect to the total multilayered composition which is one of X, Y, Z, U, ..., N, respectively, the layers being arranged in the order of low to high Curie temperature.

4. A composition as claimed in claim 2, wherein each layer consists of one kind of at least four kinds of magnetic substances selected from the group of magnetic substances having the formulae

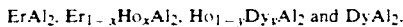

wherein $0<x<1$ and $0<y<1$, and wherein each layer has a different Curie temperature $T_C$ given by $T_{CX}$, $T_{CY}$, $T_{CZ}$, $T_{CU}$, ..., $T_{CN}$ respectively, and $T_{CX}<T_{CY}<T_{CZ}<T_{CU}$, ..., $<T_{CN}<77°$ K., and wherein each layer has a mole ratio with respect to the total multilayered composition which is one of X, Y, Z, U, ..., N, respectively, the layers being arranged in the order of low to high Curie temperature.

5. A composition as claimed in claim 2, wherein each layer consists of one kind of at least five kinds of magnetic substances selected from the group of magnetic substances having the formulae

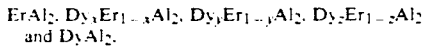

wherein $0<x<y<z<1$, and wherein each layer has a different Curie temperature $T_C$ given by $T_{CX}$, $T_{CY}$, $T_{CZ}$, $T_{CU}$, $T_{CV}$, ..., $T_{CN}$ respectively, and $T_{CX}<T_{CY}<T_{CZ}<T_{CU}<T_{CV}$, ..., $<T_{CN} \leq 77°$ K., and wherein each layer has a mole ratio with respect to the total multilayered composition which is one of X, Y, Z, U, V, ..., N respectively, the layers being arranged in the order of low to high Curie temperature.

6. A composition as claimed in claim 2, wherein the sintered layers are arranged serially and in contact with one another.

7. A composition as claimed in claim 2, wherein the sintered layers are arranged serially and are spaced apart from one another.

8. A composition as claimed in claim 1, wherein each layer consists of one kind of at least four kinds of magnetic substances selected from the group of magnetic substances having the formulae
$HoAl_2$, $Ho_{1-x}Dy_xAl_2$ and $DyAl_2$,
wherein $0<x<1$, wherein each layer has a different Curie temperature $T_C$ given by $T_{CX}$, $T_{CY}$, $T_{CZ}$, $T_{CU}$, ..., $T_{CN}$ respectively, and $T_{CX}<T_{CY}<T_{CZ}<T_{CU}$, ..., $<T_{CN} \leq 77°$ K., and wherein each layer has a mole ratio with respect to the total multilayered composition which is one of X, Y, Z, U, ..., N respectively, the layers being arranged in the order of low to high Curie temperature.

9. A composition as claimed in claim 1, wherein each layer consists of one kind of at least four kinds of magnetic substances selected from the group of magnetic substances having the formulae
$ErAl_2$, $Er_{1-x}Ho_xAl_2$, $Ho_{1-y}Dy_yAl_2$ and $DyAl_2$,
wherein, $0<x<1$ and $0<y<1$ wherein each layer has a different Curie temperature $T_C$ given by $T_{CX}$, $T_{CY}$, $T_{CZ}$, $T_{CU}$, ..., $T_{CN}$, respectively, and $T_{CX}<T_{CY}<T_{CZ}<T_{CU}$, ..., $<T_{CN} \leq 77°$ K., and wherein each layer has a mole ratio with respect to the total multilayered composition which is one of X, Y, Z, U, ..., N, respectively, the layers being arranged in the order of low to high Curie temperature.

10. A composition as claimed in claim 1, wherein each layer consists of one kind of at least five kinds of magnetic substances selected from the group of magnetic substances having the formulae
$ErAl_2$, $Dy_xEr_{1-x}Al_2$, $Dy_yEr_{1-y}Al_2$, $Dy_zEr_{1-z}Al_2$ and $DyAl_2$,
wherein $0<x<y<z<1$, wherein each layer has a different Curie temperature $T_C$ given by $T_{CX}$, $T_{CY}$, $T_{CZ}$, $T_{CU}$, $T_{CV}$, ..., $T_{CN}$ respectively, and $T_{CX}<T_{CY}<T_{CZ}<T_{CU}<T_{CV}$, ..., $<T_{CN} \leq 77°$ K., and wherein each layer has a mole ratio with respect to the total multilayered composition which is one of X, Y, Z, U, V, ..., N, respectively, the layers being arranged in the order of low to high Curie temperature.

11. A composition as claimed in claim 1, wherein each of said at least three kinds of magnetic substances has a Curie temperature which ranges from 15° to 77° K., whereby a substantially constant entropy change is achieved in a substantially constant magnetic field of a reverse Ericsson cycle type magnetic refrigerator.

12. A composition as in claim 1, wherein said composition further comprises from 0.01 to 60 mole % of at least one metal selected from the group consisting of Fe, Ni and Co.

13. A magnetic refrigeration composition for magnetic refrigeration comprising at least three kinds of magnetic substances selected from the group consisting of magnetic substances having the formulae

wherein R' is at least one element selected from the group consisting of Tb, Dy, Ho and Er, provided that the total number of atoms satisfies the above formulae and $0<\delta<0.2$, said composition being a multilayered composition of said magnetic substances present in mole ratios for each kind of X, Y, Z, ..., N, respectively, where N is the mole ratio of the Nth kind of said at least three kinds of magnetic substances and where the mole ratios range from 1 to less than 3, each layer of said multilayered composition consisting of one kind of said at least three kinds of magnetic substances and each layer consisting of a different kind of said at least three kinds of magnetic substances, and each kind of said at least three kinds of magnetic substances having a Curie temperature $T_C$ which is different from that of the other kinds and is given by $T_{CX}$, $T_{CY}$, $T_{CZ}$, ..., $T_{CN}$, respectively, where $T_{CN}$ is the Curie temperature of the Nth kind of said at least three kinds of magnetic substances, and the layers being arranged in the order of low to high Curie temperature.

14. A magnetic refrigeration composition for magnetic refrigeration comprising at least three kinds of magnetic substances selected from the group consisting of magnetic substances having the formulae

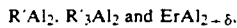

wherein R' is at least one element selected from the group consisting of Gd, Tb, Dy, Ho and Er, provided that the total number of atoms satisfies the above formulae respectively, and $0<\delta<0.2$, said composition being a multilayered composition of said magnetic substances present in mole ratios for each kind of X, Y, Z,..., N, respectively, where N is the mole ratio of the Nth kind of said at least three kinds of magnetic substances and where the mole ratios range from 1 to less than 3, each layer of said multilayered composition consisting of one kind of said at least three kinds of magnetic substances and each layer consisting of a different kind of said at least three kinds of magnetic substances provided that not every layer contains Gd, and each kind of said at least three kinds of magnetic substances having a Curie temperature $T_C$ which is different from that of the other kinds and is given by $T_{CX}$, $T_{CY}$, $T_{CZ}$, ..., $T_{CN}$, respectively, where $T_{CN}$ is the Curie temperature of the Nth kind of said at least three kinds of magnetic substances, and the layers being arranged in the order of low to high Curie temperature.

15. A composition as claimed in claim 14, wherein each layer consists of one kind of at least four kinds of magnetic substances selected from the group of magnetic substances having the formulae, $ErAl_2$, $Er_{1-x}Dy_xAl_2$ and $Dy_{1-\delta}Gd_\delta Al_2$.

wherein $0<x<1$ and $0<\delta<0.2$, wherein each layer has a different Curie temperature $T_C$ given by $T_{CX}$, $T_{CY}$, $T_{CZ}$ and $T_{CU}$, ..., $T_{CN}$, respectively, and $T_{CX}<T_{CY}<T_{CZ}<T_{CU}$, ..., $<T_{CN}\leq 77°$ K., and wherein each layer has a mole ratio with respect to the total multilayered composition which is one of X, Y, Z, U, ..., N, respectively, the layers being arranged in the order of low to high Curie temperature.

16. A composition as claimed in claim 14, wherein the magnetic substances are sintered whereby each layer is a sintered layer and is porous.

17. A composition as claimed in claim 16, wherein each layer consists of one kind of at least four kinds of magnetic substances selected from the group of magnetic substances having the formulae, $ErAl_2$, $Er_{1-x}Dy_xAl_2$ and $Dy_{1-\delta}Gd_\delta Al_2$.

wherein $0<x<1$ and $0<\delta<0.2$, and wherein each layer has a different Curie temperature $T_C$ given by $T_{CX}$, $T_{CY}$, $T_{CZ}$, $T_{CU}$, ..., $T_{CN}$, respectively, and $T_{CX}<T_{CY}<T_{CZ}<T_{CU}$, ..., $<T_{CN}\leq 77°$ K., and wherein each layer has a mole ratio with respect to the total multilayered composition which is one of X, Y, Z, U, ..., N, respectively, the layers being arranged in the order of low to high Curie temperature.

18. A magnetic refrigeration composition for magnetic refrigeration comprising at least three kinds of magnetic substances selected from the group consisting of magnetic substances having the formulae $R'Al_{2-\delta}$ and $R'_3Al_2$ wherein R' is at least one element selected from the group consisting of Gd, Tb, Dy, Ho and Er, provided that the total number of atoms satisfies the above formulae and $0<\delta<0.2$, said composition being a multilayered composition of said magnetic substances present in mole ratios for each kind of X, Y, Z, ..., N, respectively, where N is the mole ratio of the Nth kind of said at least three kinds of magnetic substances and where the mole ratios range from 1 to less than 3, each layer of said multilayered composition consisting of one kind of said at least three kinds of magnetic substances and each layer consisting of a different kind of said at least three kinds of magnetic substances provided that not every layer contains Gd, and each kind of said at least three kinds of magnetic substances having a Curie temperature $T_C$ which is different from that of the other kinds and is given by $T_{CX}$, $T_{CY}$, $T_{CZ}$, ..., $T_{CN}$, respectively, where $T_{CN}$ is the Curie temperature of the Nth kind of said at least three kinds of magnetic substances, and the layers being arranged in the order of low to high Curie temperature.

* * * * *